United States Patent [19]

Bachem et al.

[11] Patent Number: 4,857,586

[45] Date of Patent: Aug. 15, 1989

[54] NITROGEN-CONTAINING WATER-SOLUBLE COMPOUNDS

[75] Inventors: Henning Bachem, Cologne; Janos Muszik; Wolf-Dieter Schröer, both of Leverkusen; Carlhans Süling, Odenthal, all of Fed. Rep. of Germany

[73] Assignee: Bayer Aktiengesellschaft, Leverkusen, Fed. Rep. of Germany

[21] Appl. No.: 165,658

[22] Filed: Mar. 8, 1988

[30] Foreign Application Priority Data

Mar. 17, 1987 [DE] Fed. Rep. of Germany ....... 3708544

[51] Int. Cl.$^4$ .............................................. C08G 65/26
[52] U.S. Cl. ..................................... 524/845; 524/800; 528/341; 528/366; 528/405
[58] Field of Search ....................... 528/341, 366, 405; 524/845, 800

[56] References Cited

U.S. PATENT DOCUMENTS

| 1,977,251 | 10/1934 | Stallman | 528/405 X |
| 2,479,480 | 8/1949 | Dudley | 528/405 X |
| 3,493,502 | 2/1970 | Coscia | 528/405 X |
| 3,567,659 | 3/1971 | Nagy | 528/405 |
| 3,640,840 | 2/1972 | Zieman et al. | 528/342 X |
| 3,661,821 | 5/1972 | Caldo et al. | 528/405 X |
| 3,819,541 | 6/1974 | Longoria et al. | 528/405 |
| 3,915,904 | 10/1975 | Tonkyn et al. | 528/405 |
| 3,947,383 | 3/1976 | Baggett | 528/405 |
| 3,953,330 | 4/1976 | Tonkyn et al. | 528/405 X |
| 4,287,110 | 9/1981 | Takagishi et al. | 524/802 |
| 4,336,835 | 6/1982 | Takagishi et al. | 428/479.6 X |

Primary Examiner—Earl Nielsen
Attorney, Agent, or Firm—Sprung Horn Kramer & Woods

[57] ABSTRACT

Water-soluble crosslinkable compounds which are obtainable by reaction of reaction products, containing halogenohydrin groups, of ammonia or mono- or polyamines and an epihalogenohydrin or 1,3-dihalogeno-2-hydroxypropane with inorganic bases and subsequent reaction of the resulting compounds, which contain epoxy groups, with halogen-free acids or derivatives thereof to give compounds containing 1-acyloxy-2-hydroxypropyl groups are used for providing paper with a wet-strength finish, for aftertreatment of cellulose dyed with reactive and direct dyestuffs and for finishing wool.

13 Claims, No Drawings

NITROGEN-CONTAINING WATER-SOLUBLE COMPOUNDS

The invention relates to water-soluble crosslinkable compounds which are obtainable by reaction of reaction products, containing halogenohydrin groups, of ammonia or mono- or polyamines and an epihalogenohydrin or 1,3-dihalogeno-2-hydroxypropane with inorganic bases and subsequent reaction of the resulting compounds, which contain epoxy groups, with halogen-free acids or derivatives thereof to give compounds containing 1-acyloxy-2-hydroxypropyl groups, their preparation and their use for providing paper with a wet-strength finish, for aftertreatment of cellulose dyed with reactive and direct dyestuffs and for finishing wool.

Reaction products, containing halogenohydrin groups, from ammonia or mono- or polyamines and epichlorohydrin or a 1,3-dihalogeno-2-hydroxypropane are known.

Thus, for example, self-crosslinking water-soluble reaction products of epihalogenohydrins and basic polyamidoamines or polyamines or mixtures thereof are described in German Offenlegungsschriften (German Published Specifications Nos.) 2,229,219, 2,257,271, 2,938,588 and 2,949,870, German Patent Specifications Nos. 1,720,905, 1,771,043 and 1,906,450, European Patent Applications Nos. 0,131,200 and 0,126,176 and U.S. Patent Specifications Nos. 2,926,154, 3,224,990 and 3,332,901, an excess of epihalogenohydrin per equivalent of free basic amino groups being used in each case. Similar resins which are obtained by reaction of basic polyamidoamines with glycerol dichlorohydrin are described in German Offenlegungsschrift (German Published Specification No.) 1,696,248.

Water-soluble condensation products of e-caprolactam, polyamines, polyamidoamines and epichlorohydrin are known from German Offenlegungsschriften (German Published Specifications Nos.) 1,595,302 and 1,906,561.

Water-soluble resinous condensation products which are accessible by reaction of a precursor of polyamines or polyamidoamines and an α,ω-di- or polyhalogeno compound containing no epoxy groups with an epihalogenohydrin are described in German Offenlegungsschriften (German Published Specifications Nos.) 1,595,358 and 2,364,443.

According to another known process of German Offenlegungsschrift (German Published Specification No.) 2,052,023, water-soluble hardenable resins are obtained by reaction of epichlorohydrin with ammonia and/or polyamines.

Water-soluble cationic vinyl polymers which are accessible by transamidation of polyacrylamide with polyamines and subsequent reaction with epichlorohydrin are furthermore known from German Offenlegungsschrift (German Published Specification No.) 1,770,150.

Water-soluble reaction products of polyethyleneimine and epichlorohydrin or dichlorohydrin are known from German Offenlegungsschriften (German Published Specifications Nos.) 1,795,416 and 1,546,323.

Water-soluble resins of polyvinylimidazole and epichlorohydrin are known from another known process of European Patent Application No. 0,146,000.

Polycondensates of ammonia and epichlorohydrin are described in German Offenlegungsschrift No. 2,364,583 and U.S. Patent Specification No. 3,947,383.

Crosslinkable resins which have been used to date in practice and are described by the previous literature cited in general contain 1.0 to 2.5 mol of epihalogenohydrin, based on the basic nitrogen in the polyamine.

The products have a detectably high content of halogenohydrin-reactive groups; these are necessary to obtain sufficiently reactive products which are adequately capable of crosslinking.

Reaction products containing halogenohydrin groups such as are mentioned above are used for the treatment of wool, the after-treatment of dyeings on cotton, and above all for providing paper with a wet-strength finish.

Although the reaction products containing halogenohydrin groups have a high affinity to hydrated cellulose because of their cationic charge, when they are used as wet-strength agents in papermaking complete addition onto the fibres does not in general take place. Portions of the product enter the effluent unreacted, depending on the pulp density and composition, and contribute to its pollution with organically bonded halogen.

The invention was therefore based on the object of providing storage-stable cationic compounds which are crosslinkable in a neutral to alkaline medium and are at least equivalent to the customary epichlorohydrin resins in their wet-strength effect, and at the same time contain considerably less organically bonded halogen.

Surprisingly, it has now been found that new storage-stable compounds which contain considerably less organically bonded halogen and produce outstanding wet strength values are accessible by the after-treatment according to the invention of compounds containing halogenohydrin groups with organic bases and subsequent reaction of the resulting compounds containing epoxy groups with halogen-free acids or derivatives thereof.

Compounds containing halogenohydrin groups are to be understood as products which are obtained by reaction of ammonia or mono- or polyamines with an epihalogenohydrin or 1,3-dihalogeno-2-hydroxy-propane, preferably in a molar ratio of 1.0 to 3.6 mol of epihalogenohydrin or 1,3-dihalogeno-2-hydroxy-propane per mol of basic nitrogen.

The reaction with inorganic bases is preferably carried out in a molar ratio of 0.1 to 1.75 mol of base per mol of halogenohydrin group.

Further reaction of the resulting compounds containing epoxy groups with the halogen-free acids or acid derivatives is carried out up to pH values of <6.

Polyamines are understood as:
1. water-soluble basic nitrogen-containing polymers which are accessible by polymerization of monomers containing vinyl or allyl and basic amino groups,
2. water-soluble amines with primary and/or secondary and if appropriate tertiary amino, carboxamide or hydroxyl groups.

The invention particularly relates to nitrogencontaining water-soluble crosslinkable polycondensates which are obtainable by reaction of
(A) a water-soluble aliphatic mono- or polyamine with primary, secondary and if appropriate tertiary amino, carboxamide or hydroxyl groups or ammonia or mixtures thereof,
with (B) an epihalogenohydrin or 1,3-dihalogeno-2-hydroxypropane, and if appropriate simultaneous or subsequent addition of a mono- or polyamine such as in (A) or ammonia, in a molar ratio of 1.0 to 3.6 mol of component (B) per mol of basic nitrogen of component (A), (C) reaction of the products A/B with an inorganic base in a molar ratio of 0.1 to 1.75 mol of base per mol of halogenohydrin group in A/B, and (D) reaction of the basic products (C) with a halogen-free acid or acid derivative thereof up to a pH value of <6.

The polycondensates preferably have a molecular weight of 1,000–50,000.

Particularly preferred nitrogen-containing water-soluble polycondensates are obtainable by reaction of A. (1) a water-soluble mono- or polyamine of the formulae (I) to (III) or ammonia or mixtures thereof

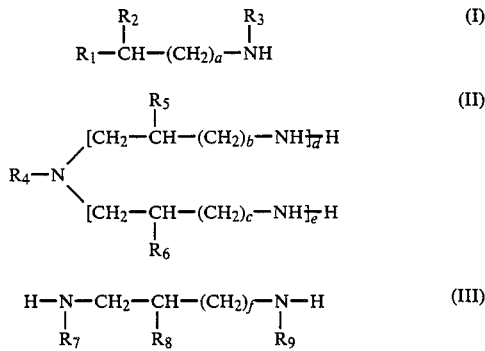

wherein $R_1$ and $R_2$ independently of one another represent hydrogen, hydroxyl or a $C_1$–$C_4$-alkyl radical which is optionally substituted by hydroxyl, $R_4$, $R_7$ and $R_9$ represent hydrogen or a $C_1$–$C_5$-alkyl radical which is optionally substituted by hydroxyl or amino, $R_3$, $R_5$, $R_6$ and $R_8$ independently of one another represent hydrogen, methyl or ethyl, a, b, c and f independently of one another represent an integer from 0 to 4 and d and e independently of one another represent an integer from 1 to 6, and/or (2) a water-soluble polyamidoamine with a molecular weight of at least 800, prepared from (α) aliphatic polyamines which contain at least two amino groups capable of amide formation and at least one other secondary or tertiary amino group, or of mixtures of these polyamines with aliphatic diamines of the formula (III), ammonia or ethyleneimine, and (β) aliphatic or aromatic dicarboxylic acids with 2 to 12 C atoms or functional derivatives thereof, such as anhydrides, esters or half-esters, and/or (γ) aminocarboxylic acids containing 3 to 6 C atoms or lactams thereof, or (3) a polyalkyleneimine prepared by polymerization of 1,2-alkyleneimines, with B. an epihalogenohydrin or 1,3-dihalogeno-2-hydroxypropane and if appropriate simultaneous or subsequent addition of a mono- or polyamine of the formulae (I)–(III) or ammonia in a molar ratio of 1.0 to 3.6 mol, preferably 1.1 to 2.5 mol, of component B per mol of basic nitrogen of component A, and C. reaction of the products A/B with an inorganic base in a molar ratio of 0.1 to 1.75 mol, preferably 0.2 to 1.5 mol of base per mol of halogenohydrin group in A/B and D. reaction of the basic products C with a halogen-free acid or acid derivative thereof up to a pH of <6, preferably 2 to 5.5.

The aqueous solutions have a viscosity of 15 to 400 mPas, preferably 20 to 300 mPas, at 25° C. and at a solids content of 5 to 35% by weight, preferably 10 to 30% by weight.

The reaction products according to the invention are preferably prepared in an aqueous medium. However, it is also possible to use other polar solvents, such as ethylene glycol, diethylene glycol, triethylene glycol, polyethylene glycol, glycerol, isopropanol, ethanol, methanol, tert.-butanol, dimethylformamide or mixtures thereof with water.

The reaction of the starting components A and B is carried out in a known manner. Aqueous or aqueousorganic approximately 15 to 60% strength solutions of the two components are stirred together here at a temperature of 25° to 95° C., preferably 40° to 80° C., until a sample of the reaction mixture in the form of a 15% strength aqueous solution has a viscosity of 20 to 200, preferably 30 to 150 mPas at 25° C.

Thereafter, to bring the action to completion and to stabilize the self-crosslinking products, acids are added to the viscous mixture so that the pH of the solution is between 1 and 6, preferably 2 and 5.5. All acids are in principle suitable as the stabilizing acids. Halogen-free acids, and in particular the acids mentioned below, can preferably be used.

In the next reaction step, the intermediate products A/B are brought to pH values of 8 to 14, preferably 8.5 to 12, with the aid of an inorganic base, such as LiOH, CsOH, Ca(OH)$_2$, Ba(OH)$_2$, NH$_3$, Na$_2$CO$_3$, K$_2$CO$_3$, CaCO$_3$, Na$_3$PO$_4$ and, in particular, KOH and NaOH, or mixtures thereof, at a temperature of 15° to 80° C., preferably 20° to 70° C.

This procedure has the effect, inter alia, of both neutralization of the free acid and epoxidization of the halogenohydrin groups to form a salt. The reaction mixture is then stirred for 10 minutes to 10 hours, preferably 15 minutes to 8 hours and particularly preferably 20 minutes to 6 hours, the basic pH values being maintained.

To form the compounds according to the invention, acid or acid derivative is then added at 15° to 80° C., preferably 20° to 70° C., in an amount such that the pH of the solution is between 1 and 6, preferably 2 and 5.5.

Acids and acid derivatives which may be mentioned are:

1. halogen-free mineral acids or acid-reacting derivatives of these acids, such as amidosulphonic acid, sulphurous acid, silicic acid, boric acid, nitric acid, carbonic acid and, in particular, sulphuric and phosphoric acid, 2. halogen-free mono- or polycarboxylic acids optionally containing hydroxyl groups or derivatives of these acids, such as acetic acid, acetic anhydride, propionic acid, oxalic acid, malonic acid, succinic acid, glutaric acid, adipic acid, maleic acid, lactic acid, tartaric acid and, in particular, formic acid, malic acid and citric acid, or mixtures thereof.

Acid derivatives are to be understood as acidreacting derivatives of the abovementioned acids, in particular anhydrides and acid salts.

The solids content of the finished products is then brought to the desired content by dilution with solvents.

In a preferred embodiment, the starting components A and B are first reacted with one another in a manner such that 15 to 60% strength, preferably 20 to 50% strength, solutions in water or the other abovementioned polar solvents or mixtures thereof with water are stirred with one another at a temperature of 25° to 95° C., preferably 40° to 80° C.

The mixture is then already brought to a pH of 8 to 14, preferably 8.5 to 12, during the polycondensation at temperatures of 15° to 95° C., preferably 20° to 70° C., with the aid of an inorganic base.

Particularly suitable inorganic bases are those mentioned above.

Cyclization of the halogenohydrin groups present in the polycondensate to epoxy groups and salt formation can take place here.

The reaction mixture is subsequently stirred for 10 minutes to 10 hours, preferably 15 minutes to 8 hours, at 15° to 80° C., preferably 20° to 70° C., basic pH values being maintained.

Acid or acid derivative is then added at this temperature in an amount such that the pH of the solution is 1 to 6, preferably 2.0 to 5.5.

Particularly suitable acids and acid derivatives are those mentioned above.

The solids content of the finished products is then adjusted as desired by dilution with solvents.

Monoamines (I) which may be mentioned are: methylamine, ethylamine, isopropylamine, butylamine, di-methylamine, aminoethanol, 3-amino-1-propanol, 3-amino-2-propanol, 4-amino-1-butanol, 5-amino-1-pentanol, 6- amino-1-hexanol and isomers thereof.

Polyamines (II) which may be mentioned are: diethylenetriamine, triethylenetetramine, tetraethylenepentamine, pentaethylenehexamine, hexaethyleneheptamine, heptaethyleneoctamine, dipropylenetriamine, tripropylenetetramine, methyl-bis-(3-aminopropyl)-amine, ethyl-bis-(3-aminopropyl)-amine, 2-hydroxy-ethyl-bis-(3-amino- propyl)-amine, dihexamethylenetriamine or mixtures thereof.

Diamines (III) which may be mentioned are: ethylenediamine, N-(2-hydroxyethyl)-ethylenediamine, N,N'-dimethyl-ethylenediamine, 1,2-diaminopropane, 1,3-diaminopropane, N,N'-dimethyl-1,3-diaminopropane, N-methyl-1,3-diamino-propane and 1,6-diaminohexane.

Examples of polyamines (A 2 α) are mentioned with the polyamines (II).

Preferred compounds are: diethylenetriamine, triethylenetetramine, tetraethylenepentamine, pentaethylenehexamine, hexaethyleneheptamine, dipropylenetriamine, methyl-bis-(3-amino-propyl)-amine, dihexamethylenetriamine or mixtures thereof, or mixtures thereof with ammonia, ethylenediamine or ethyleneimine.

Preferred dicarboxylic acids (A 2 β) are: oxalic acid, succinic acid, malonic acid, glutaric acid, adipic acid, sebacic acid, 1,12-dodecanedioic acid, itaconic acid, terephthalic acid and isophthalic acid.

The preferred compound (A 2 γ) is γ-caprolactam.

The preferred 1,2-alkyleneimine (A 3) is ethyleneimine.

Preferred examples of B are: epichlorohydrin, epibromohydrin and 1,3-dichloro-2-hydroxypropane.

The invention also relates to water-soluble crosslinkable basic polymers and polycondensates containing amino groups, which contain groups which are reactive towards paper, for example of the formula

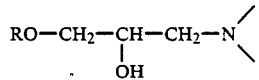

in which R represents the radical of a hydroxycarboxylic acid, in particular tartaric, malic, citric or lactic acid.

Clear, preferably aqueous solutions which are stable to storage for months, even at a high solids content of up to 35% by weight, and which outstandingly improve the wet strength of a paper finished with such a solution are obtained in the manner described under technically simple conditions which are easy to handle.

Paper is finished with the polymers according to the invention in a known manner. Preferably, the polymers are added in the form of aqueous solutions to the aqueous suspension of the paper pulp, which is then processed to paper. The amounts added are between 0.5 and 4% by weight of the aqueous solution (based on the paper pulp) with a content of polymers of 10–20% by weight, depending on the desired effect. Where the wet strength requirements are particularly high, even higher amounts are used. For example, amounts of 6% by weight or more are required for addition in the case of laminated papers with a high ash content and low weight per unit area.

The polymers according to the invention differ from known polyamine-epihalogenohydrin reaction products in respect of their content of organically bonded halogen and the AOX value (=adsorbable organic halogen). In contrast to the high contents of halogenohydrin reactive groups which are otherwise customary—also with acidification with halogen-free acids—the new products have a substantially lower content of these reactive groups.

Thus, the organic halogen content of the compounds according to the invention and the AOX value are 50 to 95%, preferably 50 to 90%, lower than in the case of known polyamine-epihalogenohydrin reaction products.

Use of the new products thus leads to a considerably lower organic halogen content in the effluent from papermaking machines and thus to considerably less ecological pollution.

The compounds according to the invention can of course also be used for after-treatment of reactive or direct dyeings on cotton or for finishing wool.

EXAMPLE 1

(a) 308 g of epichlorohydrin are added dropwise to an initial mixture of 923 g of a 50% strength aqueous solution of a polyamidoamine of German Patent No. B-1,771,043, column 4, lines 4 to 25, 15 g of methyl-bis-(3-amino- propyl)-amine and 1,891 ml of water at 30° C. in the course of 45 minutes, with stirring, and the mixture is subsequently stirred at 30° C. for 1 hour.

It is then heated up to 60° C., whereupon the viscosity of the mixture increases. A further 1,500 ml of water are added here. When the desired viscosity is reached, the pH is brought to pH: 3 with the aid of a sulphuric acid solution, the mixture is diluted with water and the finished product is degassed in vacuo.

Viscosity: 47 mPas (25° C.)
Solids content: 15.0% by weight
Organic Cl content: 1.2%
AOX value*: 10.5 g/l ≈ * The value was determined in accordance with DIN 38049 [German Standard Method for water, effluent and sludge analysis. Total action and substance separation parameters (group H), determination of the adsorbable organically bonded halogens (AOX)]. For this, the samples are diluted to a maximum TOC (total organic carbon) content of 10 mg/l and are then analysed immediately for their AOX value.

(b) 700 g of a precursor according to 1 (a) are brought to pH 11 at a temperature of 47° C. with the aid of 45% strength NaOH solution, with stirring. The mixture is subsequently stirred for 45 minutes, the pH being maintained, and is then brought to pH: 3 by means of a sulphuric acid solution.
Viscosity: 53 mPas
Solids content: 17.0% by weight
Organic Cl content: 0.48%
AOX value: 4.37 g/l

EXAMPLE 2

45% strength NaOH solution are added to 700 g of a water-soluble precursor according to Example 1 a) at 50° C., with stirring. The pH is thereby brought to pH: 9.

The mixture is then subsequently stirred at 50° C. for 5 hours, the above pH being maintained, and is then brought to pH: 2.7 with the aid of a sulphuric acid solution.
Viscosity: 40 mPas
Solids content: 16.7% by weight
Organic Cl content: 0.41%
AOX value: 2.49 g/l

EXAMPLE 3

(a) 308 g of epichlorohydrin are added dropwise to an initial mixture of 1,891 ml of water, 15 g of methyl-bis-(3-aminopropyl)-amine and 923 g of a 50% strength aqueous solution of a polyamidoamine from German Patent No. B-1,771,043, column 4, lines 4 to 25 at 30° C. in the course of 45 minutes, with stirring, and the mixture is subsequently stirred at this temperature for 1 hour.

Thereafter, the mixture is heated to 60° C., a further 1,500 ml of water are added and the mixture is stirred until the desired viscosity is reached.

The mixture is now diluted and brought to pH: 3.5 by means of a mixture of formic acid (85% strength in water) and water. The finished product is now degassed in vacuo.
Viscosity: 60 mPas (25° C.)
Solids content: 14.8% by weight
Organic Cl content: 1.1%
AOX value: 9.4 g/l (b) 700 g of a precursor according to Example 3 (a) dissolved in water are brought to pH: 9 at a temperature of 60° C. with 45% strength NaOH solution, while stirring.

Thereafter, the mixture is subsequently stirred at 50° C. for 6 hours, the pH being maintained, and is then brought to pH: 3.4 with a formic acid solution.
Viscosity: 56 mPas (25° C.)
Solids content: 15.0% by weight
Organic Cl content: 0.11%
AOX value: 0.55 g/l

EXAMPLE 4

700 g of a precursor according to Example 3 a) dissolved in water are brought to pH: 12 at 25° C. with 30% strength NaOH solution, while stirring, and the mixture is then subsequently stirred at 35° C. for 2 hours. Thereafter, the mixture is brought to pH: 3.5 with a mixture of formic acid/water.
Viscosity: 43 mPas
Solids content: 15.0% by weight
Organic Cl content: 0.41%
AOX value: 2.11 g/l

EXAMPLE 5

(a) 308 g of epichlorohydrin are added dropwise to an initial mixture of 1,891 ml of water and 930 g of a 50% strength aqueous solution of a polyamidoamine of German Patent No. B-1,771,043, column 4, lines 4 to 25, at 30° C. in the course of 30 minutes, while stirring, and the mixture is subsequently stirred at this temperature for 1 hour.

Thereafter, the mixture is heated to 60° C., 1,500 ml of water are added after 1 hour and the mixture is stirred until the desired viscosity is reached.

The pH is now brought to pH: 3.4 with the aid of a malic acid/water solution.
Viscosity: 80 mPas
Solids content: 15.9% by weight
Organic Cl content: 1.1%
AOX value: 9.9 g/l (b) 45% strength NaOH solution is added at 50° C. to 700 g of a precursor according to Example 5 a), dissolved in water, such that a pH of 10 is established.

The mixture is then subsequently stirred at 45° C. for 3 hours and is brought to pH: 3.5 by means of a malic acid solution.
Viscosity: 48 mPas (25° C.)
Solids content: 15.0% by weight
Organic Cl content: 0.17%
AOX value: 1.04 g/l

EXAMPLE 6

(a) 324 g of diethylenetriamine are taken in a three-necked flask and 438 g of adipic acid and 169.5 g of caprolactam are then added, with stirring. The temperature thereby rises to 100° C. The mixture is subsequently heated to 190° C. in the course of 3 hours, whereupon the water of reaction distils off uniformly, and the mixture is cooled to 150° C. and 800 ml of water are added. The mixture is subsequently stirred at 85° C. for 1 hour and cooled.
Viscosity 330 mPas
Solids content: 51.7% by weight
Base equivalent weight: 429

(b) 58.7 g of epichlorohydrin are added to an initial mixture of 215 g of a precursor according to Example 6 (a) and 350 ml of water at 30° C. in the course of 45 minutes and the mixture is subsequently stirred at 30° C. for 1 hour.

Thereafter, the mixture is heated to 65° C., whereupon the viscosity increases. During the condensation, 350 ml of water are added in portions. As soon as the desired viscosity is reached, the mixture is brought to pH: 3.0 with a hydrochloric acid solution.
Viscosity: 74 mPas (25° C.)
Solids content: 15.3% by weight
Organic Cl content: 1.11%
AOX value: 6.44 g/l (c) 700 g of a precursor according to Example 6 (b) are brought to pH: 10 with an NaOH solution and the mixture is stirred at 50° C. for 4 hours, the pH being kept at 10 by addition of NaOH.

Thereafter, the mixture is brought to pH: 3.5 by means of a citric acid-water solution.

Viscosity: 66 mPas (25° C.)
Solids content: 15.0% by weight
Organic Cl content: 0.45%
AOX value: 1.43 g/l

EXAMPLE 7

(a) The reaction product of a polyamidoamine according to European Patent No. A-0,131,200, Example 2 (a) with epichlorohydrin analogously to European Patent No. A-0,131,200, Example 2 b) was brought to pH: 4 with a sulphuric acid solution.

Viscosity: 49 mPas (25° C.)
Solids content: 20.0% by weight
Organic Cl content: 1.18%
AOX value: 9.21 g/l (b) 700 g of a product according to Example 7 (a) are brought to pH: 9.5 at 60° C. with the aid of an aqueous NaOH solution and the mixture is stirred for 4 hours, the pH being maintained. The mixture is then acidified to pH: 4 by means of a sulphuric acid solution.

Viscosity: 52 mPas (25° C.)
Solids content: 20.0% by weight
Organic Cl content: 0.20%
AOX value: 1.35 g/l

EXAMPLE 8

(a) 130 g of epichlorohydrin are added dropwise to an initial mixture of 110 g of 25% strength aqueous ammonia solution and 300 ml of water in the course of 1 hour. The internal temperature thereby rises to about 95° C.

Stirring is then continued at this temperature until the viscosity increases noticeably, a further 240 ml of water and 9 g of ammonia solution are added and the mixture is acidified to pH: 3.5 at the desired viscosity by means of a sulphuric acid solution.

Viscosity: 80 mPas (25° C.)
Solids content: 15.0% by weight
Organic Cl content: 1.14%
AOX value: 5.91 g/l (b) 700 g of a product according to Example 8 (a) are brought to pH: 12 at 55° C. with an aqueous NaOH solution, while stirring, and the mixture is subsequently stirred at this temperature for 1 hour, the pH being maintained.

Thereafter, the mixture is brought to pH: 3.0 with a sulphuric acid solution.

Viscosity: 36 mPas (25° C.)
Solids content: 15.0% by weight
Organic Cl content: 0.44%
AOX value: 2.75 g/l

EXAMPLE 9

(a) 119 g of epichlorohydrin are added to an initial mixture of 51 g of methyl-bis-(3-aminopropyl)-amine and 270 ml of water at 30° C. in the course of 2 hours.

The mixture is then heated at 55° C. and acidified to pH: 3 at the desired viscosity with a sulphuric acid/acetic acid solution.

Viscosity: 195 mPas (25° C.)
Solids content: 36.0% by weight
Organic Cl content: 2.28%
AOX value: 26.5 g/l (b) 700 g of a product according to Example 9 (a) dissolved in water and 700 ml of water are brought to pH: 11 at 40° C. with 20% strength KOH solution and the mixture is stirred at this temperature for 2 hours. Thereafter, the mixture is brought to pH: 3 with a sulphuric acid/acetic acid solution.

Viscosity: 87 mPas (25° C.)
Solids content: 18.0% by weight
Organic Cl content: 0.7%
AOX value: 4.15 g/l

EXAMPLE 10

26.0 g of epichlorohydrin are added dropwise to an initial mixture of 92.3 g of a 50% strength aqueous solution of a polyamidoamine of German Patent No. B-1,771,043, column 4, lines 4 to 25, and 189 ml of water at 30° C. in the course of 45 minutes, while stirring, and the mixture is subsequently stirred at 35° C. for 1 hour.

It is then heated to 60° C. and diluted with 165 ml of water as the viscosity increases. The mixture is cooled to 40° C., brought to pH: 10 by means of 45% strength NaOH solution and further stirred until the desired viscosity is reached. It is now acidified to pH: 2.5 by addition of a sulphuric acid solution and the solids content is adjusted.

Viscosity: 74 mPas (25° C.)
Solids content: 15.0% by weight
Organic Cl content: 0.37%
AOX value: 1.95 g/l

USE EXAMPLE

Bleached pine sulphite pulp is beaten at a pulp density of 2.5% in a Hollander to a Schopper-Riegler degree of freeness of 38°. 100 g of this pulp are introduced into a glass beaker and diluted to 1 l with water.

2 or 4% by weight of the product according to the invention (15% by weight of solids), based on the fibre, are introduced into the glass beaker. After a stirring time of 3 minutes, sheets of paper with a weight per unit area of about 80 g/m² are formed with the contents of the glass beakers on a sheet-forming machine (Rapid-Kothen unit). The sheets of paper are dried at 90° C. for 6 minutes in vacuo under a pressure of 20 mm/Hg and are after-heated at 110° C. in a drying cabinet for a further 15 minutes.

After conditioning, 5 test strips 1.5 cm wide are cut out of each sheet of paper and are immersed in distilled water for 5 minutes. Thereafter, the wet strips are clamped in a tensile testing machine and the wet breaking load is determined.

The results obtained are shown in the following table.

| Examples | Wet breaking load (Newton) Amount used | |
|---|---|---|
| | 2% | 4% |
| 1 b | 10.9 | 14.7 |
| 2 | 11.6 | 16.5 |
| 3 b | 11.8 | 17.0 |
| 4 | 11.0 | 15.4 |
| 5 b | 11.4 | 16.0 |
| 11 | 11.0 | 16.6 |

EXAMPLE 11

186.5 kg of epichlorohydrin are pumped into an initial mixture of 790 kg of a 50% strength aqueous solution of a polyamidoamine of German Patent No. B-1,771,043, column 4, lines 4 to 25 and 1,488 l of water in the course of 30 minutes and, when the addition has ended, the mixture is subsequently stirred at 30–35° C. for 30 minutes. The contents of the kettle are then heated to 55° C. As soon as a viscosity of 55 mPas is reached, the mixture is diluted by addition of 1,500 l of water, cooled to 35° C. and brought to pH 9.7, on cooling, by means of 50% strength NaOH solution.

After a further 30 minutes, the mixture is diluted with a further 465 l of water and is then further stirred until the desired viscosity at 35° to 40° C. is reached.

The mixture is then acidified to pH 2.8 with sulphuric acid and the solids content is adjusted to the desired value.

Viscosity: 58 mPas (25° C.)
Solids content: 15.0% by weight
Organic Cl content: 0.30%
AOX value: 2.4 g/l

We claim:

1. Water-soluble crosslinkable compounds which are obtainable by a reaction of reaction products, containing halogenohydrin groups, of polyamines and an epihalogenohydrin or 1,3-dihalogeno-2-hydroxy-propane with inorganic bases and a subsequent reaction of the resulting compounds, which contain epoxy groups, with halogen-free mineral acids, mono- or polycarboxylic acids or derivatives thereof.

2. Water-soluble polycondensates according to claim 1, which are obtainable by reaction of
   (A) a water-soluble aliphatic polyamine with primary, secondary and if appropriate tertiary amino, carboxamide or hydroxyl groups,
   (B) with an epihalogenohydrin or 1,3-dihalogeno-2-hydroxy-propane, and if appropriate simultaneous or subsequent addition of a polyamine such as in (A), in a molar ratio of 1.0 to 3.6 mol of component (B) per mol of basic nitrogen of component (A),
   (C) reaction of the products A/B with an inorganic base in a molar ratio of 0.1 to 1.75 mol of base per mol of halogenohydrin group in A/B,
   (D) reaction of the basic products (C) with a halogen-free acid or acid derivative thereof up to a pH value of 6.

3. Water-soluable polycondensates according to claim 1, which are obtainable by reaction of
   A. (1.) a water-soluble amine of the formula

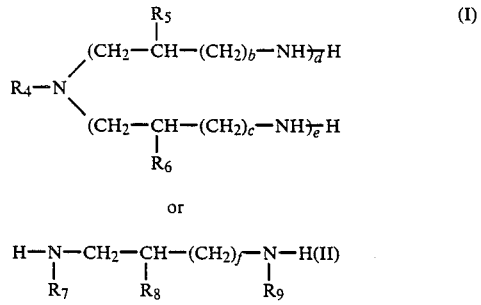

or $$H-N-CH_2-CH-(CH_2)_f-N-H \quad (II)$$
   $$\phantom{H-N-}|\phantom{CH_2-CH-(CH_2)_f-}|\phantom{N-}|$$
   $$\phantom{H-N-}R_7 \phantom{CH_2-}R_8 \phantom{(CH_2)_f-}R_9$$

wherein
   $R_4$, $R_7$ and $R_9$ represent hydrogen or a $C_1$–$C_5$-alkyl radical which is unsubstituted or substituted by hydroxyl or amino,
   $R_5$, $R_6$ and $R_8$ independently of one another represent hydrogen, methyl or ethyl,
   a, b, c and f independently of one another represent an integer from 0 to 4 and
   d and e independently of one another represent an integer from 1 to 6, and/or
   (2.) a water soluble polyamidoamine with a molecular weight of at least 800, prepared from ($\alpha$) aliphatic polyamines which contain at least two amino groups capable of amide formation and at least one other secondary or tertiary amino group, or of mixtures of these polyamines with aliphatic diamines of the formula (II), ammonia or ethyleneimine, and
   ($\beta$) aliphatic or aromatic dicarboxylic acids with 2 to 12 C atoms or functional derivatives thereof, and/or
   ($\gamma$) aminocarboxylic acids containing 3 to 6 C atoms or lactams thereof, or
   (3) a polyalkyleneimine prepared by polymerization of 1,2-alkyleneimines, with
   B. An epihalogenohydrin or 1,3-dihalogeno-2-hydroxy-propane and if appropriate simultaneous or subsequent addition of a polyamine of the formulae (I) or (II) in a molar ratio of 1.0 to 3.6 mol, of component B per mol of basic nitrogen of component A, and
   C. reaction of the products A/B with an inorganic base in a molar ratio of 0.1 to 1.75 mol, of base per mol of halogenohydrin group in A/B and
   D. reaction of the basic products C with a halogen-free mineral acid, mono- or polycarboxylic acid or an acid derivative thereof up to a pH of 6.

4. Water-soluble crosslinkable compounds according to claim 1, dissolved in water to form 5 to 35 weight% solids in aqueous solutions having a viscosity of 15 to 400 mPas at 25° C.

5. Water-soluble crosslinkable compounds according to claim 1, wherein the inorganic base is selected from the group consisting of NaOH, KOH, LiOH, CsOH, $Ca(OH)_2$, $CaCO_3$, $Na_3PO_4$ and mixtures thereof.

6. Water-soluble crosslinkable compounds according to, claim 1 wherein the halogen-free acid or deriviative thereof is selected from the group consisting of amidosulphonic acid, sulphurous acid, silicic acid, boric acid, nitric acid, carbonic acid, sulphuric acid, phosphoric acid, acetic acid, acetic anhydride, propionic acid, oxalic acid, malonic acid, succinic acid, glutaric acid, adipic acid, maleic acid, lactic acid, tartaric acid, formic acid, malic acid, citric acid and mixtures thereof.

7. Water-soluble polycondensates according to claim 1, with a molecular weight of 1,000–50,000.

8. Process for the preparation of water-soluble crosslinkable compounds, comprising reacting reaction products, containing halogenohydrin groups, of polyamines and epihalogenohydrin or 1,3-dihalogeno-2-hydroxypropane with inorganic bases and then reacting the resulting compounds containing epoxy groups with halogen-free acids or derivatives thereof.

9. Process for the treatment of paper, comprising contacting paper with water-soluble crosslinkable compounds of claim 1.

10. A water-soluble polycondensate according to claim 3, wherein the pH is 2 to 5.5.

11. A water-soluble polycondensate according to claim 1, wherein the molar ratio of inorganic base to halogenohydrin in A/B is 0.2 to 1.5.

12. A water-soluble polycondensate according to claim 3, wherein the functional derivatives of the aliphatic or aromatic dicarboxylic acids with 2 to 12 C atoms are selected from the group consisting of anydrides, esters and half-esters.

13. A water-soluble polycondensate according to claim 3, wherein the molar ratio in step B is 1.1 to 2.5.

* * * * *